Sept. 24, 1935. J. E. LILIENFELD 2,015,482
METHOD OF EFFECTING METAL REFRACTORY JOINT AND JOINTS RESULTING THEREFROM
Filed June 29, 1932

INVENTOR
JULIUS EDGAR LILIENFELD
BY
ATTORNEY

Patented Sept. 24, 1935

2,015,482

UNITED STATES PATENT OFFICE 2,015,482

METHOD OF EFFECTING METAL-REFRACTORY JOINT AND JOINTS RESULTING THEREFROM

Julius Edgar Lilienfeld, Winchester, Mass., assignor to Ergon Research Laboratories, Inc., Malden, Mass., a corporation of Delaware Application June 29, 1932, Serial No. 620,050

17 Claims. (Cl. 49—81)

The invention relates to a method of welding certain metals to non-metallic refractory materials, and to the novel joints attained thereby.

While the invention has several objects, which will become apparent in the following description thereof, it has for its particular objects the provision of a mechanically substantial welded joint between silicious refractory material and metals having a component sufficiently electro-positive to react with a silicious component of a refractory, the metal adhering to said refractory by direct molecular contact therewith; the provision of gas-tight joints of this nature, and more particularly the provision of metal to refractory welded joints in which the metal has such combined properties of plasticity and expansivity that during the manufacture and later use of the joint, particularly at elevated temperatures, the stresses induced by reason of the difference between the coefficients of expansion of the metal and the refractory do not fracture the latter nor separate the metal from the refractory; and more especially the provision of such joints between aluminum and a silicious refractory.

A still further object of the invention resides in the provision of a joint embodying the aforesaid properties and wherein the metal element may be constituted of two different grades, the one in immediate contact with the refractory being of a pure or high-purity grade, while the other is of a more greatly alloyed grade and better suited from a mechanical standpoint than the other which is more suitable for effecting the direct molecular contact between metal and refractory.

I have found that certain metals having a component sufficiently electropositive to react with a silicious component of the refractory may be welded to the refractory to accomplish the above objects. Such metals as aluminum and magnesium may, under certain conditions, be caused to thus react with the refractory forming a silicized transition layer between the metal and the refractory and thus securing molecular contact therebetween and affording a true welded joint.

Joints of this nature may find use in many different applications, both as mechanical supports or connections for insulating refractories and joints that are liquid- and/or gas-tight, as for sealing off containers. These welded joints may be utilized, for example, in the suspension of insulating bases for high-voltage equipment or terminals for oil-filled transformers and condensers, terminals for pressure-gas-filled tanks containing transformers, condensers, switches, lightning arresters, etc.; electrodes of electrolytic condensers, resistors, spark plugs, refractory seals and similar devices; also, in connection with high-vacuum apparatus, such as Dewar flasks, X-ray tubes and other vacuum discharge devices; mercury-filled devices operated both in vacuum and/or high-pressure, such as mercury toggle switches, mercury rectifiers, mercury lamps, etc.

In attaining the above objects, a welded joint is secured as, for example between aluminum and porcelain, in the manner hereinafter more fully set forth and in which the aluminum, or magnesium, is of such plasticity and expansivity that it will stand up under the heating and subsequent cooling of the welding operation without destroying the refractory material or the joint.

It is to be noted that genuinely sealed joints between silicious insulators and metals having different coefficients of expansion have heretofore been founded upon an entirely different physical basis than that herein disclosed. Thus, it has been the practice to join the molten insulator to the solid metal, whereas in accordance with the present invention, the metal is applied in molten condition to a silicious refractory. Moreover, the difference in expansion was compensated for in the seals of the prior art by utilizing very thin metal, the seal being mostly between a metal wall of greatly reduced thickness and the silicious insulator whereby the difference of expansion between metal and insulator was accommodated by the inherent elasticity of the metal itself.

For this reason, these seals were mechanically vulnerable, due to the extreme thinness of the metal at the sealing portion.

In contradistinction to the prior art and in carrying out the present invention, a welded joint between the metal in a molten condition and a silicious refractory is provided, the expansion differences being accommodated by the inherent plasticity of the metal, rather than by shaping the metal so as to rely upon its elasticity, and such that the plastic metal will conform to the stresses induced by reason of the difference between the coefficients of expansion of the metal and the refractory; and thus, by virtue of so conforming, will prevent fracture of the refractory and/or prevent separation of said refractory from the metal in securing a molecular contact therebetween. For this reason, a substantial mass of metal at the weld may be obtained and a rugged joint is secured and may be of such a nature, furthermore, as to be maintained at elevated temperatures.

A further novel characteristic of the joint resides in the fact that the temperature of the refractory during the welding action is such as to exceed the melting temperature of the heated metal to be welded thereto by an amount sufficient to attain the reaction between the metal and the refractory, resulting in the formation of the aforesaid transition layer.

It is to be noted that without such a reaction, a sweated joint rather than a weld would result, which sweated joint could not have the required qualities of mechanical strength and/or tightness, especially not at an elevated temperature.

This application is a continuation in part of my copending applications Serial No. 486,101, filed October 3, 1930, and Serial No. 515,885, filed February 14, 1931.

In the accompanying drawing, which illustrates, by way of example, specific embodiments of the novel joint.

Figure 1:
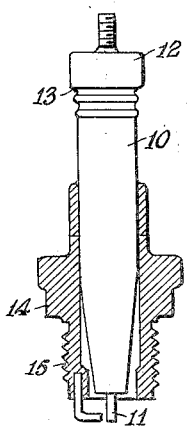
Fig. 1 is a vertical section of a spark plug embodying the novel joint.

In the provision of these joints between a silicious refractory, such as porcelain, and a metal, such as aluminum, having a component sufficiently electropositive to react with a silicious component of the refractory in the manner hereinafter set forth to produce a weld, it is to be noted that by the term "weld" or "welded" as applied to the joint herein described and referred to in the claims, I wish to be understood as having reference to the direct consolidation of the two solid bodies—metal and refractory—to the extent of molecular cohesion by fusion at their junction.

Furthermore, as aluminum of different grades of purity is suitable for effecting the novel joint, the characteristics of the joint being determined to a large degree by the particular grade of aluminum utilized, I desire, further, to define the word "aluminum" as herein used to include not only substantially pure aluminum but also various suitable alloys of aluminum with other metals.

For example, an alloy of aluminum with 1.25% of manganese; an alloy of aluminum 1.25% of manganese and 1% of magnesium; an alloy of aluminum with 8% of copper, 12½% of silicon and 1.15% of magnesium; an alloy of aluminum with 5% silicon; an alloy of aluminum with 5% silicon, 1.2% copper, and .5% of magnesium; an alloy of aluminum with 7% silicon and 0.3% magnesium; an alloy of aluminum with 0.8% of nickel, 0.4% of iron, and 0.1% of titanium, has been found to afford satisfactory welds under certain conditions.

Also, the term "pure aluminum" as utilized herein is to be understood as referring to aluminum containing 99% or better of aluminum and such as is normally produced in the well-known reduction methods for obtaining aluminum from its ores, while the term "high purity" aluminum is intended to refer to the preferred form of aluminum and containing approximately 99.6% or more of aluminum.

In connection with the degree of purity of the pure aluminum, it is to be noted that the amount of the impurities ordinarily present in the aluminum has a deleterious effect on the favorable combination of plasticity and expansivity and that the higher the degree of purity of the aluminum, the greater its plasticity characteristic.

Certain alloys of aluminum compounded so as to make them undesirable for use in the novel welding process in this respect do not possess the high degree of plasticity required for effecting, for example, a joint which will be gas-tight on repeated heating and cooling, yet are of such a nature as to afford a suitable joint where these rigid requirements are not met with. By this I do not wish to necessarily imply that the weld per se is not perfect and a molecular cohesion not attained, but rather that there may be isolated areas in which no such contact exists and that therefore these portions might leak.

Other alloys are compounded unfavorably so as to become "hot short" as a result of the heating; and a joint effected therewith develops a certain degree of porosity, although the joint may be perfectly satisfactory in a mechanical respect and having certain useful applications, as where the retention of gas or liquid is not an important item, or in instances where the joint is not to be subsequently subjected to elevated temperatures.

Particularly in the case of pure aluminum and certain aluminum alloys such as aluminum with 1.25% of manganese, and aluminum with 1.25% of manganese and 1% of magnesium, is it possible to effect a joint that is gas-tight and/or one which will not fail under repeated heating and cooling.

Where a joint of the very best characteristics is desired, however, high purity aluminum has been found to be the metal best suited for this purpose, this being particularly true where the refractory is a material such as fused quartz, which is extremely brittle.

The particular grade of aluminum required in connection with the production of a joint between the same and the selected refractory and if the desired characteristic is that of perfect gas-tightness, may readily be determined, e. g., welding a threaded aluminum fitting to a tube of the refractory closed at one end, and by connecting said fitting to a gas pressure tank of, say, 250 lb. pressure or to a vacuum system, and by observing the pressure or absence of a leak first at room temperature, and second at a more elevated temperature which in some cases may be 80° C., and in other cases run up as high as 300° C. or even higher.

In carrying out the method for providing the welded joint between a silicious refractory and a metal, an intermediate transition layer of the silicized metal is formed which provides molecular contact between the said metal and the said refractory, the reaction between the metal and the refractory being direct. This is best effected by heating the refractory at the area to be welded to a temperature greatly exceeding the melting temperature of the metal, as to a yellow heat and approximating 1100° C., which temperature will insure the aforesaid reaction desired. The aluminum is also heated and then placed in contact with the refractory whereby the temperature of the aluminum is elevated, either by further external heating or from the accumulated heat from the refractory, or both, to an intense degree such as to cause the aluminum to flow in melting over the silicious component of the refractory to react with it.

In effecting the weld, it is desirable to coat the aluminum prior to its contact with the heated refractory with a substance which will not dissolve the oxide skin upon the aluminum to a detrimental degree and which has a tendency rather to protect the aluminum from oxidizing too deeply, and to provide an envelope for supporting the metal in a molten state even if heated considerably above its melting point. This envelope should be of a flexible character and I have found that a layer of molten borax is particularly suitable for this purpose, being when molten viscous enough to adhere to the aluminum and at the same time is sufficiently liquid to allow the aluminum which in this case is heated above its melting point to adjust itself to the contour of the refractory.

Furthermore, the borax probably facilitates the reaction between the aluminum and the refractory, as it will run in its molten condition the freest at the tip where the aluminum is the thinnest and hottest, and thus causes the aluminum to be released at this point and make it flow freely, resulting in the aluminum "wetting" the surface of the refractory to effect a molecular contact therewith.

Other agents suitable for this purpose are boric acid, boric oxide, sodium silicate, and ground glass retained by a suitable combustible vehicle or binder such as collodion.

The action of these agents is therefore quite different from that of an ordinary flux in welding one metal to another, and wherein it serves to dissolve the skin, for example oxide, forming on the metal and thus causing the latter to flow irregularly in all directions, in the absence of any envelope to restrain it. Such action would be entirely unsuitable in the present instance.

In contradistinction to the usual method of effecting a joint between a metal and a refractory, I cause the metal to melt while the refractory remains in its solid phase, and, moreover, is heated to a temperature far above the melting point of the metal which is to be welded thereto, the particular temperature required being that necessary to attain the reaction between the electropositive component of the metal and the silicious component of the refractory. Furthermore, the enveloping agent utilized is of such a nature as to attain a more or less liquid state at the welding area though adhering to the metal in a molten condition and serving to restrain it from undue dispersion of the refractory.

As a particularly satisfactory refractory in the production of these joints, porcelain may be utilized, especially that variety known as "Sillimanite"; also, quartz, glass, especially of the borasilicate type as well as other silicates. The refractory is preferably utilized in cylindrical form as bushings, tubes, rods, etc; and the area to be welded is preferably, though not necessarily, first glazed as by a fluoride or borax glazing.

As a specific example of the method of effecting a welded joint and its practical application, a spark plug has been selected, reference being had to Fig. 1 of the drawing. As shown, the axial tubing 10 of the plug is of insulating material such as porcelain or "Sillimanite" and through the same extends the conductor or electrode element 11 which is welded at the one end to the inside of a cap member or terminal 12. The latter seats over the tube and is shown as welded along its edge 13 thereto. This cap member may be of pure aluminum or aluminum of high purity in order that a joint may be secured in which the welded contacts will remain permanent under repeated heating and cooling.

Furthermore, a weld is effected between the said tube 10 and the upper part of the housing 14 which is of pure aluminum or aluminum of high purity for welding contact with said tube. The remainder of the housing element is constituted, preferably, of aluminum of a harder grade such, for example, as an alloy of aluminum with 1.25% of manganese, or an alloy of aluminum with 1.25% of manganese and 1% of magnesium and which may readily be machined.

By this expedient, the threads 15 cut into the housing for insertion of the plug will retain their form and will not be ruined in insertion or removal of said plug as would be the case in the softer form of pure aluminum or aluminum of high purity. The latter, however, serves the useful function of securing a joint with the porcelain which is permanent under repeated heating and cooling such as will obtain in the use of the spark plug.

Figure 2:
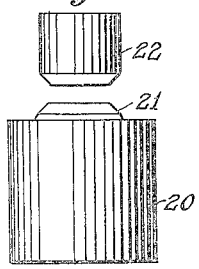
Figs. 2 to 4 are elevations illustrating the production of a fabricated aluminum article effected by the novel process.
Figure 3:
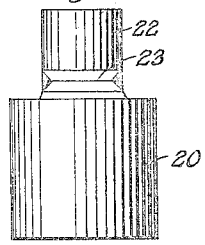
Figure 4:
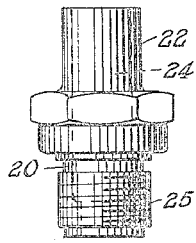

A bushing similar to the bushing 14 with its sleeve of more plastic aluminum may readily be constructed on the manner indicated in Figs. 2 to 4. Reference being had thereto, it will be noted that a block 20 of the harder grade of aluminum is provided with a beveled neck portion 21 and this is placed in juxtaposition with the corresponding beveled end of a rod portion 22, as indicated in Fig. 3. Thereupon, the two abutting beveled ends are welded together along their junction 23 and then machined to provide the axial bore 24 therethrough as well as the threads 25, etc., as indicated in the complete fabricated article, Fig. 4.

Figure 5:
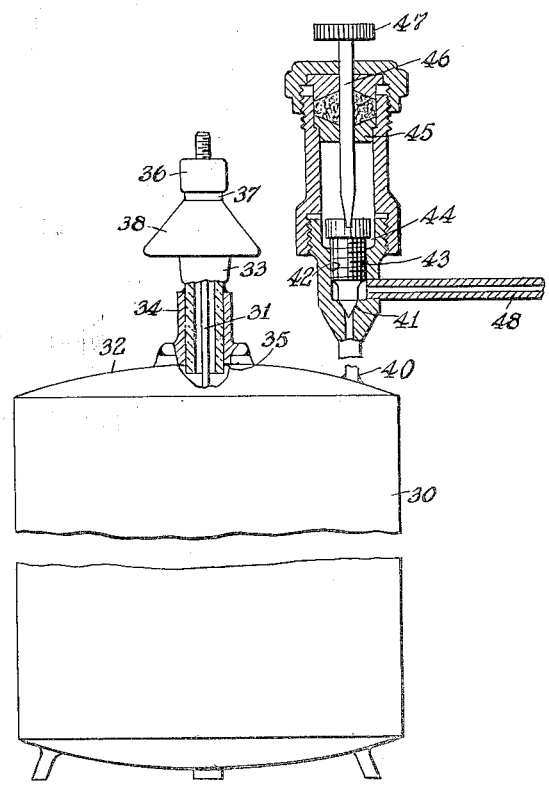
Fig. 5 is a part vertical section and elevation of a container sealed in accordance with the novel process, with portion on exaggerated scale.

Fig. 5 illustrates another practical embodiment of the invention, for example, the sealing of a metal container against the escape of gas such as nitrogen, hydrogen, carbon dioxide, air, etc. under extremely high pressure, or against the loss of high-vacuum provided therein. The container to this end is designed to comprise a completely welded pressure-sealed vessel. For example, a container 30 is constituted of aluminum of sufficient strength to withstand the pressure to which the apparatus is to be subjected and may house electrodes, etc., of which a riser 31 is indicated as extending through the cover or top 32 for affording external connection. Such outlet must of necessity be secure to avoid wastage or loss of the gas which is to be confined permanently therein.

Similar difficulties exist in connection with the operation of high-voltage transformers with sealed-in fluid especially such with a high-pressure gas enclosed above the level of the fluid, in the operation of electric refrigerators wherein the mechanism is hermetically sealed within a gaseous medium under pressure, etc., as well as in the case of vacuum-sealed apparatus.

The riser 31 is designed to pass through the top 32 of the container and in such a manner as to be electrically insulated therefrom and sealed against loss of the high-pressure fluid retained by the container. To this end, a tubular insulator and refractory member 33 is designed to surround a portion of the said riser, more especially the part protruding beyond the cover 32.

There is also provided a metal (aluminum) outlet member as the sleeve 34 which is welded to the opening 35 of the cover member to secure a sealing or gas-tight fit thereto.

The sealing of the outer portion of the insulator member is effected by means of a terminal cap 36 which fits over the outer end 37 of said member above a flange 38 thereof which is provided thereon to adapt the device for outdoor work.

As aluminum may only be welded to aluminum, although of different grades, the sleeve 34 is preferably of pure aluminum or aluminum of high purity for insuring a weld to the porcelain permanent under repeated heating and cooling, and is welded to the cover member or top 32 of the container. The latter is also of aluminum, preferably of a more or less harder grade such as an alloy of aluminum with 1.25% of manganese, or an alloy of aluminum with 1.25% of manganese and 1% of magnesium.

As the container is to be sealed by welding throughout, provision is made to introduce the gas therein or to evacuate the container 30 through a tubular aluminum connection 40 welded thereto, the same in the case of a positive pressure seal being enlarged at its outer end and provided with a seat 41 having the threaded portion 42 beyond the same. In this is adapted to be screwed a plug 43 which is adapted to seal the tube 40 at said seat. To this end, the plug 43 is slotted at its outer end and fits into a chamber 44 of the enlarged outer end, said chamber being closed at its upper end through a suitable stuffing box 45 through which passes a wrench member 46 adapted to engage the slot in the head of plug 43 to advance the same toward the seat 41 by turning the outer end or head 47 of the wrench member.

To the chamber 44 is welded an aluminum tube 48 extending therefrom to a source of pressure (not shown). After the desired degree of pressure has been attained in the container 30, plug 43 is seated on the seat 41, thus sealing off the said container. After this, the source of pressure supply is cut off and, if necessary, a source of vacuum substituted.

The stuffing box is then unscrewed from the end of the tubular connection 40 and a cap member or the like (not shown) of aluminum is welded over the exposed end beyond the sealing plug 43, whereupon the tube 48 is sealed by welding the same together.

In the case of a vacuum seal, the provision of the sealing plug, of course, becomes unnecessary as the aluminum vacuum connection may be directly welded shut.

Figure 6:
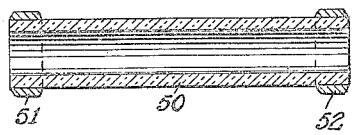
Figs. 6 and 7 are longitudinal sections through a resistor further illustrating the manner of effecting the novel joint.
Figure 7:
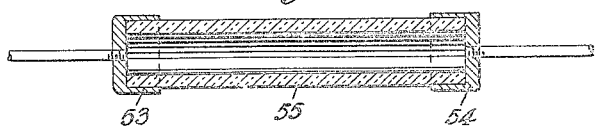

Another embodiment of the invention is indicated in Figs. 6 and 7, which show resistors of refractory insulating material having welded terminal members of aluminum. For example, reference being had to Fig. 6, the tube 50 of porcelain or the like, and preferably of a porous character, has applied to its ends the terminal rings 51 and 52 which may conveniently be welded thereon by heating the tube ends and then depositing a layer of aluminum by wiping the molten end of an aluminum wire over the heated porcelain surface.

Or, as indicated in Fig. 7, terminal cap 53 and 54 of aluminum may be welded over the opposite ends of the tube 55.

The conducting substance between the terminals in both cases may either be initially included in the porcelain or be applied after the welding of the said terminals thereto.

I claim:

1. The method of welding aluminum to a silicious refractory, which comprises heating the refractory at the area to be welded to a temperature greatly exceeding the melting temperature of the aluminum, applying to the exterior surface of the metal area to be welded an agent for producing an envelope over the molten aluminum and adapted to facilitate the wetting of the refractory thereby, heating the aluminum and placing it in contact with the refractory, and raising the temperature of the aluminum to flow it upon the highly heated refractory.

2. The method of welding aluminum to a silicious refractory, which comprises heating the refractory at the area to be welded to a temperature greatly exceeding the melting temperature of the aluminum, applying a coating of borax to the exterior surface of the metal area to be welded, heating the aluminum and placing it in contact with the refractory, and raising the temperature of the aluminum to flow it upon the highly heated refractory.

3. A welded joint between an alloy of aluminum and a silicious refractory, including an intermediate stratum of aluminum of not less than 99% purity and of sufficient plasticity to compensate for the difference between its thermic expansivity and that of the refractory, said stratum being in direct molecular contact with the said aluminum alloy and over a small portion with the refractory at the welded areas and in the case of the latter through a silicized transition layer.

4. A welded joint, comprising an alloy of a metal of the nature set forth, a silicious refractory, a stratum of said metal of a lesser degree of hardness and of sufficient plasticity to compensate for the difference between its thermic expansivity and that of the refractory, said metal being welded to the alloyed metal, and a silicized transition layer of the metal of lesser hardness providing molecular contact between a small portion thereof and the said refractory.

5. The described welded unit comprising a plurality of bodies, one a silicious refractory, another an alloy of a metal having a component sufficiently electropositive to react with a silicious component of the refractory, and a further and intermediate body of the metal of relatively high purity and of sufficient plasticity to compensate for the difference between its thermic expansivity and that of the refractory, each body of individual shape, said bodies being united molecularly at adjacent surfaces and in the case of the relatively pure metal over a small portion thereof and through a silicized transition layer.

6. The method of forming a welded unit comprising a silicious refractory and a body of metal of the group comprising aluminum and magnesium, said method comprising coating the exterior surface of the metal area to be welded with an agent for providing an envelope over the metal when molten, raising the temperature of the refractory to a point substantially higher than the melting point of the metallic body and bringing a small portion of the latter into reacting contact with the former to molecularly join the metal and refractory thereat, and permitting the union of said metal portion and the refractory to set to form a completed weld.

7. The method of forming a welded unit comprising a silicious refractory and a metallic body containing a component sufficiently electropositive to react with a silicious component of the refractory, said method comprising coating the exterior surface of the metallic body with borax, raising the temperature of the refractory to a point substantially higher than the melting point of the metallic body and bringing a small portion of the latter into reacting contact with the former to molecularly join the metal and refractory thereat, and permitting the union of said metal portion and the refractory to set to form a completed weld.

8. The method of forming a welded unit comprising a silicious refractory and a metallic body containing a component sufficiently electropositive to react with a silicious component of the refractory, said method comprising coating the exterior surface of the metallic body with borax, raising the temperature of the refractory to a point substantially higher than the melting point of the metallic body, preliminarily heating the latter and bringing a small portion of the same into reacting contact with former to molecularly join the metal and refractory thereat, and permitting the union of said metal portion and the refractory to set to form a completed weld.

9. The method of forming a welded unit among a plurality of bodies, one a silicious refractory, another a preformed member consisting of a body of an alloy of aluminum and a body of aluminum of relatively high purity, said method comprising first welding the two bodies of aluminum, raising the temperature of the refractory to a point substantially higher than the melting point of the aluminum of relatively high purity and bringing a small portion of the latter into reacting contact with the refractory to molecularly join the aluminum of relatively high purity and refractory thereat, and permitting the joined portion of aluminum of relatively high purity and the refractory to set to form a completed weld.

10. The method of forming a welded unit among a plurality of bodies, one a silicious refractory, another a preformed member consisting of a body of an alloy of aluminum and a body of aluminum of relatively high purity, said method comprising first welding the two bodies of aluminum, machining the weld, raising the temperature of the refractory to a point substantially higher than the melting point of the aluminum of relatively high purity and bringing a small portion of the latter into reacting contact with the refractory to molecularly join the aluminum of relatively high purity and refractory thereat, and permitting the joined portion of aluminum of relatively high purity and the refractory to set to form a completed weld.

11. The method of forming a welded unit among a plurality of bodies, one of porcelain, another a preformed member consisting of an alloy of aluminum, and of aluminum of relatively high purity, said method comprising first welding the two bodies together, raising the temperature of the porcelain to a point substantially higher than the melting point of the aluminum of relatively high purity and bringing a small portion of the latter with alloy into reacting contact with the porcelain to molecularly join the aluminum of relatively high purity and refractory thereat, and permitting the joined portion of aluminum of relatively high purity and the porcelain to set to form a completed weld.

12. The method of forming a welded unit consisting of a body of a silicious refractory and a preformed body of a metal of the group comprising aluminum and magnesium, said method comprising strongly heating both bodies, the refractory body at the area to be welded being heated to a temperature above the melting point of the metal, positioning them in their final juxtaposed relationship and bringing at said area of the refractory the metal into reacting contact therewith without melting the metal body as a whole, thus securing an intermediate silicized transition layer affording a direct molecular junction and a rapid solidification of the molten metal upon completion of the weld through dissipation of heat by the unmelted portion of the metal body.

13. The method of forming a welded unit consisting of a body of a silicious refractory and a preformed body of a metal of the group comprising aluminum and magnesium, said method comprising strongly heating both bodies, the refractory body at the area to be welded being heated to a temperature above the melting point of the metal, positioning them in their final juxtaposed relationship and effecting a flow at said area of a small portion of the metal body as compared to the total mass thereof, thus securing an intermediate silicized transition layer affording a direct molecular junction and a rapid solidification of the molten metal upon completion of the weld through dissipation of heat by the unmelted portion of the metal body.

14. The method of forming a welded unit consisting of a body of porcelain and a preformed body of aluminum, said method comprising preliminarily heating the porcelain body at the area to be welded to a temperature above the melting point of the aluminum, preliminarily heating the aluminum body, positioning them in their final juxtaposed relationship and bringing at said area of the porcelain the aluminum into reacting contact therewith without melting the aluminum body as a whole, thus securing an intermediate silicized transition layer affording a direct molecular junction and a rapid solidification of the molten metal upon completion of the weld through dissipation of heat by the unmelted portion of the aluminum body.

15. The method of forming a welded unit consisting of a body of porcelain and a preformed body of aluminum, said method comprising strongly heating both bodies, the porcelain body at the area to be welded being heated to a temperature above the melting point of the aluminum, positioning them in their final juxtaposed relationship and bringing at said area of the porcelain the aluminum into reacting contact with the porcelain by forcibly directing thereat a stream of heated gaseous medium and without melting the aluminum body as a whole, thus securing an intermediate silicized transition layer affording a direct molecular junction and a rapid solidification of the molten metal upon completion of the weld through dissipation of heat by the unmelted portion of the aluminum body.

16. The method of forming a welded unit consisting of a body of porcelain and a preformed body of aluminum, said method comprising strongly heating both bodies, the porcelain body at the area to be welded being heated to a temperature above the melting point of the aluminum, positioning them in their final juxtaposed relationship and bringing at said area of the porcelain the aluminum into reacting contact with the porcelain without melting the aluminum body as a whole, applying additional heat to the contacting areas, thus securing an intermediate silicized transition layer affording a direct molecular junction and a rapid solidification of the molten metal upon completion of the weld through dissipation of heat by the unmelted portion of the aluminum body, and withdrawing the additional source of heat.

17. The method of forming a welded unit consisting of a body of porcelain and a preformed body of aluminum, said method comprising strongly heating both bodies, the porcelain body at the area to be welded being heated to a temperature above the melting point of the aluminum, positioning them in their final juxtaposed relationship and bringing at said area of the porcelain a relatively small mass of the aluminum into reacting contact with the porcelain without melting the aluminum body as a whole, thus securing an intermediate silicized transition layer affording a direct molecular junction and a rapid solidification of the molten metal upon completion of the weld through dissipation of heat by the unmelted portion of the aluminum body.

JULIUS EDGAR LILIENFELD.